(12) United States Patent
Asheim et al.

(10) Patent No.: US 11,181,093 B2
(45) Date of Patent: Nov. 23, 2021

(54) ROTOR BLADE WITH NOISE REDUCTION MEANS

(71) Applicant: Siemens Gamesa Renewable Energy A/S, Brande (DK)

(72) Inventors: Michael J. Asheim, Littleton, CO (US); Kristoffer Ahrens Dickow, Skanderborg (DK); Peder Bay Enevoldsen, Vejle (DK); Alex Loeven, Herning (DK); Valerio Lorenzoni, Kebenhavn (DK); Stefan Oerlemans, Herning (DK); Anders Smaerup Olsen, Frederiksberg (DK); Bodo Richert, Brande (DK); Manjinder J. Singh, Broomfield, CO (US); Sigmund Wenningsted Torgard, Fredericia (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 955 days.

(21) Appl. No.: 15/300,316

(22) PCT Filed: Jul. 30, 2014

(86) PCT No.: PCT/EP2014/066406
§ 371 (c)(1),
(2) Date: Sep. 29, 2016

(87) PCT Pub. No.: WO2015/192915
PCT Pub. Date: Dec. 23, 2015

(65) Prior Publication Data
US 2017/0138340 A1      May 18, 2017

(30) Foreign Application Priority Data

Jun. 18, 2014  (EP) .................................... 14172977

(51) Int. Cl.
*F03D 1/06*          (2006.01)

(52) U.S. Cl.
CPC ............. *F03D 1/0675* (2013.01); *F03D 1/06* (2013.01); *F03D 1/0633* (2013.01);
(Continued)

(58) Field of Classification Search
CPC .... F03D 1/0633; F03D 1/0641; F03D 1/0675; F03D 1/0683; F03D 7/0232; F03D 3/061;
(Continued)

(56) References Cited

U.S. PATENT DOCUMENTS 7,901,189 B2 *   3/2011   Gupta ................... F03D 1/0675
                                                     416/230
8,267,657 B2     9/2012   Davidson et al.
(Continued)

FOREIGN PATENT DOCUMENTS

CA       2719171 A1    2/2010
CN       1904355 A     1/2007
(Continued)

OTHER PUBLICATIONS

Barone, Matthew F., "Survey of Techniques for Reduction of Wind Turbine Blade Trailing Edge Noise", Aug. 2011, Sandia National Laboratories (Year: 2011).*
(Continued)

*Primary Examiner* — Kenneth Bomberg
*Assistant Examiner* — Julian B Getachew
(74) *Attorney, Agent, or Firm* — Schmeiser, Olsen & Watts LLP

(57) ABSTRACT

A rotor blade for a wind turbine is provided. The rotor blade includes a pressure side, a suction side, a leading edge section with a leading edge, and a trailing edge section with a trailing edge. An airflow flows along the surface of the rotor blade from the leading edge section to the trailing edge section and builds up a boundary layer in close proximity to the surface of the rotor blade. The rotor blade includes a (Continued)

noise reduction device for reducing noise which is generated by interaction of the airflow and the rotor blade. The noise reduction device is located within the boundary layer of the rotor blade. The noise reduction device includes a cover and connection device for connecting the cover to the surface of the rotor blade. The cover spans at least over a part of the surface of the rotor blade.

6 Claims, 7 Drawing Sheets

(52) U.S. Cl.
CPC ..... *F05B 2240/221* (2013.01); *F05B 2240/32* (2013.01); *F05B 2260/96* (2013.01); *F05B 2280/6012* (2013.01); *F05B 2280/6013* (2013.01); *Y02E 10/72* (2013.01)

(58) Field of Classification Search
CPC .................. F03D 3/065; F05B 2260/96; F05B 2240/122; F05B 2240/30; F05B 2240/301; F05B 2240/302; F05B 2240/3062; F01D 5/145; F04D 29/681; B64C 23/06
USPC .............................. 416/228, 235, 236 R, 237
See application file for complete search history.

(56) References Cited

U.S. PATENT DOCUMENTS

| | | | |
|---|---|---|---|
| 8,414,261 B2* | 4/2013 | Bonnet | F03D 1/0641 416/1 |
| 2007/0025858 A1 | 2/2007 | Driver et al. | |
| 2009/0232658 A1 | 9/2009 | Gerber et al. | |
| 2010/0047070 A1 | 2/2010 | Slot et al. | |
| 2010/0143151 A1 | 6/2010 | Kinzie et al. | |
| 2011/0211954 A1 | 9/2011 | Bonnet | |
| 2011/0268558 A1* | 11/2011 | Driver | F03D 80/00 415/119 |
| 2012/0027590 A1 | 2/2012 | Bonnet | |
| 2012/0134837 A1 | 5/2012 | Drobietz et al. | |
| 2017/0122286 A1* | 5/2017 | Alexander | F03D 1/0633 |

FOREIGN PATENT DOCUMENTS

| | | |
|---|---|---|
| CN | 101517227 A | 8/2009 |
| DE | 102010026588 A1 | 1/2012 |
| EP | 1338793 A2 | 8/2003 |
| WO | WO 2014048581 A1 | 4/2014 |
| WO | WO2014048581 A1 | 4/2014 |
| WO | WO 2015169471 A1 | 11/2015 |

OTHER PUBLICATIONS

J.G. Schepers et al.: "SIROCCO: Silent rotors by acoustic optimisation", ftp://ftp.ecn.nl/pub/www/library/report/2007/m07064.pdf; 2007.
Stefan Oerlemans: "Detection of aeroacoustic sound sources on aircraft and wind turbines", http://doc.utwente.nl/67363/1/thesis S Oerlemans.pdf, chapter 8, ISBN 978-90-80-6343-9-8; 2009.
Clark et al.: "The Noise Generating and Suppressing Characteristics of Bio-Inspired Rough Surfaces", AIAA paper 2014-2911, Proceedings of the 20th AIAA/CEAS Aeroacoustics Conference, Atlanta, USA, Jun. 2014.
S. Oerlemans et al.: "Reduction of Landing Gear Noise using Meshes", 16th AIAA/CEAS Aeroacoustics Conference, Stockholm, Jun. 7-9, 2010.
European Examination Report for Application No. 14 747 354.0-1607 dated Oct. 9, 2017.
International Search Report and Written Opinion; PCT/EP2014/066406; International Filing Date: Jul. 30, 2014; 11 pgs.

* cited by examiner

ROTOR BLADE WITH NOISE REDUCTION MEANS

CROSS-REFERENCE TO RELATED APPLICATIONS

This application claims priority to PCT Application No. PCT/EP2014/066406, having a filing date of Jul. 30, 2014, based off of EP Application No. 14172977.2 having a filing date of Jun. 18, 2014, the entire contents of which are hereby incorporated by reference.

FIELD OF TECHNOLOGY

The following relates to a rotor blade for a wind turbine. Specifically, the invention relates to a rotor blade with a noise reduction means or device for reducing noise which is generated by interaction of the airflow and the rotor blade.

BACKGROUND

Noise which is arising from rotor blades of wind turbines is a critical factor when it comes to obtaining a permission to erect a wind turbine. This is particularly the case if wind turbines shall be erected close to residential areas.

Wind turbines may be deliberately operated at reduced power in order to meet noise constraints. A substantial portion of onshore wind turbines are actually running at reduced power due to noise constraints at least during certain time periods. These noise constraints may be in a range of one decibel to six decibels. One decibel noise reduction can cost two percent to four percent of annual energy production.

Consequently, the provision of ways to reduce and mitigate noise that is generated by the interaction of the rotor blade and the airflow that is flowing around the rotor blade is desirable.

For large wind turbines which comprise rotor blades with a length exceeding 40 meters, a dominant noise source is trailing edge noise from the outer part of the rotor blades. Another important noise source is leading edge noise that is generated by turbulences at the leading edge section of the rotor blade.

Different ways to reduce rotor blade related noise have been proposed in the past. One option to reduce rotor blade related noise is the provision of serrated flaps that are attached to the trailing edge of the rotor blade. Another option is an adapted design of the airfoil shape of the rotor blade. Particularly the trailing edge section of the rotor blade can be modified in such a way.

Despite these measures, there still exists the need and desire to further reduce noise that is generated by the interaction of the rotor blade and airflow flowing around the rotor blade.

It has been realized by the inventors that for further reducing the rotor blade related noise, a consideration of technical fields that are far off the technical field of rotor blades could be fruitful.

For instance, a theoretical analysis of the aeroacoustics of the down material covering the upper wing surface of some species of owls have been investigated by Clark et al. and its insights have been published in the scientific article "The Noise Generating and Suppressing Characteristics of Bio-Inspired Rough Surfaces", AIAA paper 2014-2911, Proceedings of the $20^{th}$ AIAA/CEAS Aeroacoustics Conference, Atlanta, USA, June 2014. In this publication, it has been postulated that the down material covering the upper wing surface of owls could be understood as a canopy, which may result in a reduction in surface pressure fluctuations and in a reduction of the noise scattered from an underlying rough surface, particularly at lower frequencies.

However, the cited article is silent about any applications of the disclosed theoretical analysis.

SUMMARY

An aspect relates to a rotor blade with noise reduction means. In particular, it shall be investigated if and how the cited theoretical analysis of Clark et al. regarding the silent flight of owls could be transferred to rotor blades, especially to rotor blades that are suited for wind turbines.

According to embodiments of the invention there is provided a rotor blade for a wind turbine, wherein the rotor blade comprises a pressure side, a suction side, a leading edge section, and a trailing edge section. The leading edge section comprises a leading edge and the trailing edge section comprises a trailing edge. An airflow flows along the surface of the rotor blade from the leading edge section to the trailing edge section. It builds up a boundary layer in close proximity to the surface of the rotor blade. The rotor blade comprises furthermore a noise reduction means or device for reducing noise that is generated by interaction of the airflow and the rotor blade. The noise reduction means or device is located within the boundary layer of the rotor blade. The noise reduction means or device comprises a cover and connection means or device for connecting the cover to the surface of the rotor blade. The cover spans at least over a part of the surface of the rotor blade. The cover is located at a predetermined distance of the surface of the rotor blade. The cover is porous with an open area fraction between 30 percent and 95 percent, in particular between 55 percent and 85 percent.

The cited study of Clark et al. could be interpreted in a way that noise which is produced by an airflow flowing along a rough surface can be reduced significantly by an owl inspired porous canopy in the turbulent boundary layer. The roughness noise is in this case generated by roughness elements, which scatter the unsteady pressure fluctuations beneath the turbulent boundary layer into sound. The canopy may reduce the unsteady surface pressures drastically, and as a result, the far field noise may be reduced.

A key aspect of embodiments of the invention is the transfer and the extension of this theoretical analysis of roughness noise on owl wings to trailing edge or leading edge noise of rotor blades for a wind turbine. For instance, significant scattering occurs at the trailing edge of a rotor blade, which is located downstream of a smooth surface of the rotor blade. By adding a canopy-shaped noise reduction means or device in the boundary layer in the vicinity of the trailing edge, the surface pressures and the far field trailing edge noise can be reduced significantly. Since the canopy-shaped noise reduction means or device is highly porous and positioned inside the boundary layer, the aerodynamic effect induced by drag is expected to be small.

In other words, by applying the theoretical study and analysis of the silent flight of owls to rotor blades, in particular to a rotor blade of a wind turbine, a noise reduction means or device comprising a cover and connection means or device for connecting the cover to the surface of the rotor blade is provided. By this measure, the boundary layer of the airflow flowing from the leading edge section to the trailing edge section is modified. A possible explanation for the noise reducing effect is that large turbulent structures inside the boundary layer are moved away from the surface of the rotor blade, thus reducing the surface pressures.

If, for instance, noise that is generated by interaction of the airflow and the trailing edge shall be reduced, the installation of a noise reduction means upstream of the trailing edge has the effect of separating large turbulent structures inside the boundary layer from the surface of the rotor blade upstream of the trailing edge. As a consequence, sound is not radiated as intensively as if the large turbulent structures were not separated from the surface of the rotor blade.

Thus, noise that is generated or scattered at a trailing edge is reduced, particularly at the important low frequencies. The canopy may produce self-noise at higher frequencies. However, noise at higher frequencies are attenuated more efficiently and more strongly in the ambient atmosphere. Therefore, the combination of a low-frequency noise reduction and a possible high-frequency noise increase can result in an overall noise reduction as perceived in the far field of the rotor blade.

In the context of this patent application, a wind turbine refers to a device that can convert wind energy, i.e. kinetic energy from wind, into mechanical energy. The mechanical energy is subsequently used to generate electricity. A wind turbine is also denoted a wind power plant.

The boundary layer is the layer of air in the immediate vicinity of a bounding surface, namely the surface of the rotor blade. In the boundary layer the effects of viscosity are significant. In particular, the velocity of the airflow is below 99 percent of the free stream velocity of the airflow. A typical thickness of the boundary layer of a rotor blade of 40 meters to 80 meters length is in a range of a few millimeters up to a few centimeters. In other words, a typical thickness of the boundary layer is between a few millimeters and ten centimeters. The noise reduction means is located within the boundary layer of the rotor blade. Advantageously, the noise reduction means is entirely submerged into the boundary layer. This means that the maximum vertical dimension of the noise reduction means is smaller than the thickness of the boundary layer.

An advantage of placing the noise reduction means within the boundary layer is that drag of the noise reduction means is minimized. Also the generation of (unwanted) vortices by the noise reduction means is minimized.

Note that embodiments of the invention are not limited to reducing noise at the trailing edge section of the rotor blade. Also other noise sources, such as leading edge noise generated at the leading edge section of the rotor blade, may be efficiently reduced by the described noise reduction means or device.

The noise reduction means or device comprises a cover at a predetermined distance away from the surface of the rotor blade. The cover is connected, i.e. attached to the surface of the rotor blade by connection means or device. This arrangement comprising the cover and the connection means or device means or device is also referred to as a canopy. The cover is not an entirely closed surface, but comprises openings, i.e. open space, which may have various shapes and various sizes. The open area fraction of the cover is defined as the fraction of open space with regard to the whole area covered by the cover.

In an advantageous embodiment, the cover is connected to the surface of the rotor blade in a fixed, predetermined distance. The predetermined distance is in a range between 0.5 millimeters and 100 millimeters, in particular between 1 millimeter and 40 millimeters.

In another advantageous embodiment, the rotor blade comprises a root section, where the rotor blade is arranged and prepared for being attached to a rotor. Furthermore, the rotor blade comprises a tip section, which is the section of the rotor blade that is furthest away of the root section. The noise reduction means is connected to the rotor blade in the outer 40 percent, in particular in the outer 30 percent, of the rotor blade adjacent to the tip section.

In other words, it is advantageous to place the noise reduction means or device in an outboard section adjacent to the tip section of the rotor blade. This is advantageous because at this section of the rotor blade a significant fraction of the overall noise that is generated by the rotor blade and airflow flowing around the rotor blade is generated.

Note that it might be advantageous to vary the characteristics of the noise reduction means, e.g. the porosity of the cover or the predetermined distance between the cover and the surface of the rotor blade, along the spanwise direction of the rotor blade. Thus, an individual and customized noise reduction is possible.

There exist variable design options for the cover of the noise reduction means or device.

In one embodiment, the cover comprises a grid with bars or fibers. In particular, the bars are orientated in streamwise direction with regard to the airflow.

An advantage of having a cover comprising a set of bars is that such a cover is relatively easy to manufacture. Via the thickness of the bars and the spacing in between adjacent bars, the open area fraction of the cover can be determined and adapted accordingly.

Exemplarily, the streamwise direction coincides with a chordwise orientation of the rotor blade. Other directions than the streamwise direction are possible as well. Thus, it may also be advantageous to have a 45° angle between the streamwise direction of the air flow and the orientation of the bars of the cover.

In another option, a mesh-shaped cover is implemented. The mesh may comprise a first set of first bars which are substantially parallel to each other and a second set of second bars which are substantially parallel to each other, too. The first set of first bars and the second set of second bars may comprise an angle of 90°. The mesh may be rotated such that the first set of first bars and the second set of set bars are in a 45° angle relative to the airflow.

Other types of meshes such that e.g. a mesh composed by a plurality of polygons connected with each other are possible, too.

As connection means or device, a rectangular or serrated frame may be beneficial in order to span the mesh cover reliably and efficiently.

Another option to build a canopy-shaped cover is the provision of a cross-woven brush with low density at the surface of the rotor blade—in order to allow the airflow flow there—and an open brush, e.g. with a porosity between 60 percent to 80 percent, on top of it. Similarly, multiple layers of meshes with different densities could be used. The different layers of brush or mesh may be arranged such that they partially overlap, like shingles on a roof or scales on a fish.

In another advantageous embodiment, the cover is a porous fabric comprising threads, and the porosity of the fabric is realized by open space between adjacent threads. In other words, the cover may comprise a plurality of fibers.

Another option to build the canopy-shaped cover is the use of streamwise fibers in combination with barbs or side-branches, to achieve the same porosity with less streamwise fibers. The barbs may be in the same plane as the streamwise fibers or may be pointed up or down at an angle. If the barbs are in the plane of the streamwise fibers, they may be oriented perpendicular to the fibers, or at an angle.

In another advantageous embodiment, the cover comprises a plurality of sub-covers, and the porosity of the cover is realized by open space between adjacent sub-covers.

These sub-covers may have various shapes and sizes. For instance, hooks from a conventional hook-and-loop fastener may be used. The hooks may form a canopy, i.e. a porous surface at some distance from the surface of the rotor blade. An advantage of e.g. using a fabric strip of a hook-and-look fastener, which is also called a "Velcro®", is that it is well proven as a device as such, readily available and inexpensive. Also variants of a standard Velcro®, such that a "Dual Lock™ Reclosable Fastener of the company "3M" with mushroom shaped stems of polypropylene material may be suitable.

In another advantageous embodiment, the section between the cover and the surface of the rotor blade is filled with foam, in particular with open cell foam.

The foam may have the technical effect of preventing large turbulent boundary layer structures from creating an unsteady pressure footprint on the surface which may be scattered as noise at the trailing edge. Note that a sufficiently large rate of flow through the foam has beneficially to be ensured. The open cell foam may consist of a thin layer of metal or other suitable material.

In another advantageous embodiment the cover is represented by the outer layer of the foam. The outer layer of the foam and the remaining part of the foam may form one single entity.

In other words, the cover and the foam which fills the space between the cover and the surface of the rotor blade are made of one piece. Thus, a piece of foam is placed on top of the surface of the rotor blade in order to reduce noise by separation, i.e. displacement, of the large-scale boundary layer turbulence with regard to the surface of the rotor blade.

Another configuration of the noise reduction means or device is the provision of fibers with a stiff first portion and a flexible second portion. The stiff first portion realizes the connection means or device and the flexible second portion realizes the cover. The second portion may also comprise barbs, which have to be understood as small side branches, i.e. further portions in order to realize the predetermined porosity of the cover. The first portion forming the connection means or device may extend perpendicular to the surface of the rotor blade or form an angle other than 90° with regard to the surface of the rotor blade.

Another option is to use rigid nails with fibers connected to the nails. The nails may project vertically from the surface or they may be inclined. The nails may have a flat head, for example with a triangular shape or like a delta wing in order to create the desired porosity.

Another option is, instead of using a stiff connection means or device, the use of flexible thin fibers or brush hairs, possibly with small barbs. The dimensions of the fibers or hairs could be in the same order of magnitude as for the owl wings: a length of one millimeter to two millimeters, resulting in a predetermined distance of the canopy-shaped cover between 0.25 millimeters and 1.5 millimeter. The porosity, i.e. the open area ratio of the cover may be chosen to 70%. However, a larger predetermined distance in view of a larger boundary layer thickness at the trailing edge of a wind turbine blade may be beneficial, too.

Advantageously, the noise reduction means or device covers at least partially the trailing edge section of the rotor blade. This is advantageous because a significant fraction of the noise that is generated by interaction of the rotor blade with the airflow flowing around the rotor blade is generated at the trailing edge section. More specifically, a significant share of the noise is generated at the trailing edge of the trailing edge section.

Advantageously, the noise reduction means or device is combined with other noise reduction means or device, e.g. conventional noise reduction means or device such as a flap, in particular a serrated flap. The noise reduction means or device may also be combined with other aerodynamic add-ons in general, such as Gurney flaps, for instance.

Advantageously, a part of the cover extends further downstream into the airflow, wherein downstream refers to the area behind the trailing edge of the rotor blade. This may be the case either with a wrapped around cover but also with a cover that is just applied to one of both the surface of the pressure side or the surface of the suction side.

Advantageously, the extension of the cover upstream of the trailing edge is between 2 cm and 20 cm, in particular between 5 cm and 15 cm.

Thus, the lateral dimensions of the noise reduction means or device may be larger than the predetermined distance of the rotor blade to the surface.

In another advantageous embodiment, the extension of the cover downstream of the trailing edge is between 0.5 mm and 50 mm, in particular between 1 mm and 25 mm.

The noise reduction means or device may directly be attached to the rotor blade. Alternatively, the cover may be attached on a connection plate via the connection means or device, and the connection plate may be attached to the surface of the rotor blade.

This has the advantage that the noise reduction means or device can be manufactured separately. Instead of attaching every single connection means or device directly to the surface of the rotor blade, the connection means or device have to be attached to the connection plate. This is particularly advantageous if the noise reduction means or device is a retrofit that is connected with an existing and installed rotor blade.

The connection means or device may be arranged in chordwise orientation with regard to the rotor blade.

A chordwise orientation typically substantially coincides with a flow direction of the airflow. A chordwise orientation of the connection means or device has the advantage that it minimizes the aerodynamic effect of the connection means or device with regard to the impinging airflow.

Alternatively, the connection means or device may also be arranged in spanwise orientation with regard to the rotor blade.

A spanwise orientation of the connection means or device may have the advantage of increased stability and robustness of the noise reduction means or device. The drawback of potentially increased aerodynamic effect may be acceptable if, for instance, the airflow is guided such that interaction of the airflow and the connection means or device is minimal anyway.

The connection means or device may comprise an aerodynamic shape in order to minimize splitting up vortices of the airflow which impinges on the connection means or device.

In another advantageous embodiment, the noise reduction means or device covers at least partially the leading edge section of the rotor blade.

This is advantageous as leading edge noise, which may occur for example due to impinging turbulence, may reduce the efficiency of the wind turbine, too. The efficiency reduction due to leading edge noise is to be induced indirectly because the wind turbine has to be operated in a curtailed mode due to the leading edge noise.

The canopy-shaped cover is beneficially mounted at the round leading edge section of the rotor blade.

In another advantageous embodiment, the cover is wrapped around the trailing edge and/or the leading edge of the rotor blade. Thus, the cover is covering at least partially the pressure side and the suction side.

In one alternative, the noise reduction means or device is configured and arranged such that it only covers part of the pressure side of the rotor blade. Then, specifically noise that is generated by the passage of the airflow at the pressure side is reduced.

Likewise, the noise reduction means or device may also be exclusively arranged and placed at the suction side of the rotor blade. Then, specifically noise that is generated by the passage of the airflow at the suction side is reduced.

It may, as a third alternative, also be beneficial to cover parts of both the pressure side and the suction side of the rotor blade with the noise reduction means or device.

Note that in order to prevent clogging, streamwise fibers are more advantageous than a porous surface with small openings. Cross stream fibers have the advantage to crack off dirt automatically due to vibrations.

A canopy with streamwise fibers is preferably made of a material which is resistant against absorption of water so that the thickness of the material remains the same.

Furthermore, the material preferably withstands ultraviolet radiation, heat, cold and/or erosion. Furthermore, the material is preferably harmless to human beings and animals, such as cows grazing around the wind turbine.

Preferably, the material is not poisonous.

Note that embodiments of the invention have been described in the context of rotor blades, in particular for the application in wind turbines. However, the inventive concept may also be highly beneficial in neighboring technical fields, such as aircraft wings including flaps and slats, landing gears, helicopter blades, cooling fans, ventilators and the like.

BRIEF DESCRIPTION

Some of the embodiments will be described in detail, with reference to the following figures, wherein like designations denote like members, wherein.

DETAILED DESCRIPTION

Figure 1:
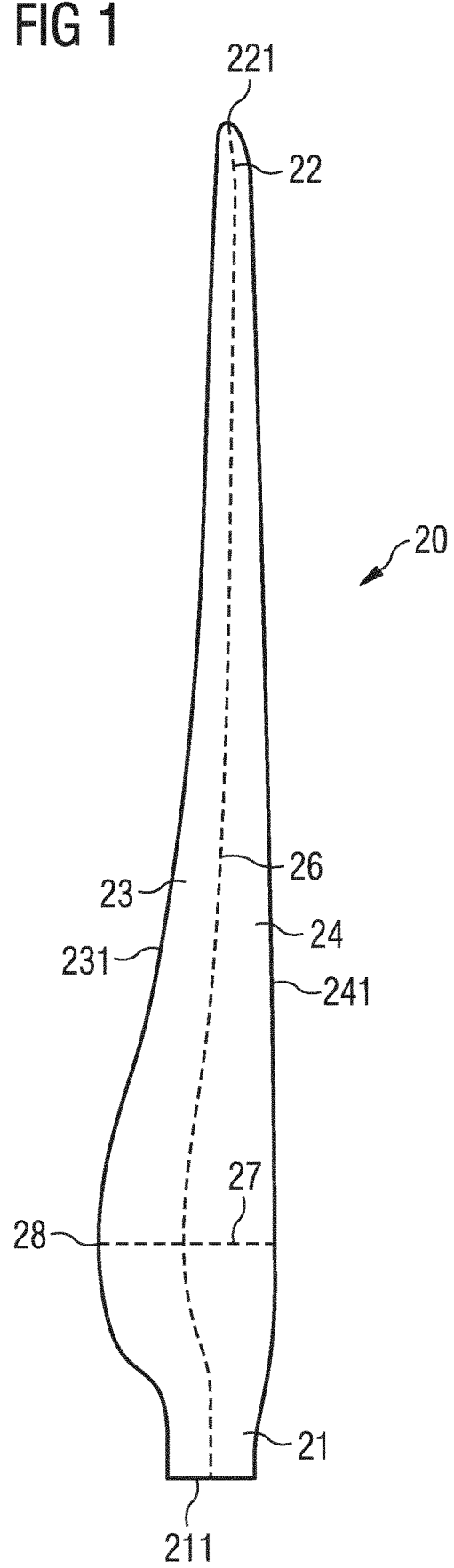
FIG. 1 shows a rotor blade of a wind turbine.

The illustration in the drawings is in schematic form. It is noted that in different figures, similar or identical elements may be provided with the same reference signs.

FIG. 1 shows a rotor blade 20 of a wind turbine. The rotor blade 20 comprises a root section 21 with a root 211 and a tip section 22 with a tip 221. The root 211 and the tip 221 are virtually connected by the span 26 which follows the shape of the rotor blade 20. If the rotor blade were a rectangular shaped object, the span 26 would be a straight line. However, as the rotor blade 20 features a varying thickness, the span 26 is slightly curved, i.e. bent as well. Note that if the rotor blade 20 was bent itself, then the span 26 would be bent, too.

The rotor blade 20 furthermore comprises a leading edge section 24 with a leading edge 241 and a trailing edge section 23 with a trailing edge 231.

The trailing edge section 23 surrounds the trailing edge 231. Likewise, the leading edge section 24 surrounds the leading edge 241.

At each spanwise position, a chord line 27 which connects the leading edge 241 with the trailing edge 231 can be defined. Note that the chord line 27 is perpendicular to the span 26. The shoulder 28 is defined as the region where the chord line 27 comprises a maximum chord length.

Furthermore, the rotor blade 20 can be divided into an inboard section which comprises the half of the rotor blade 20 adjacent to the root section 21 and an outboard section which comprises the half of the rotor blade 20 which is adjacent to the tip section 22.

Figure 2:
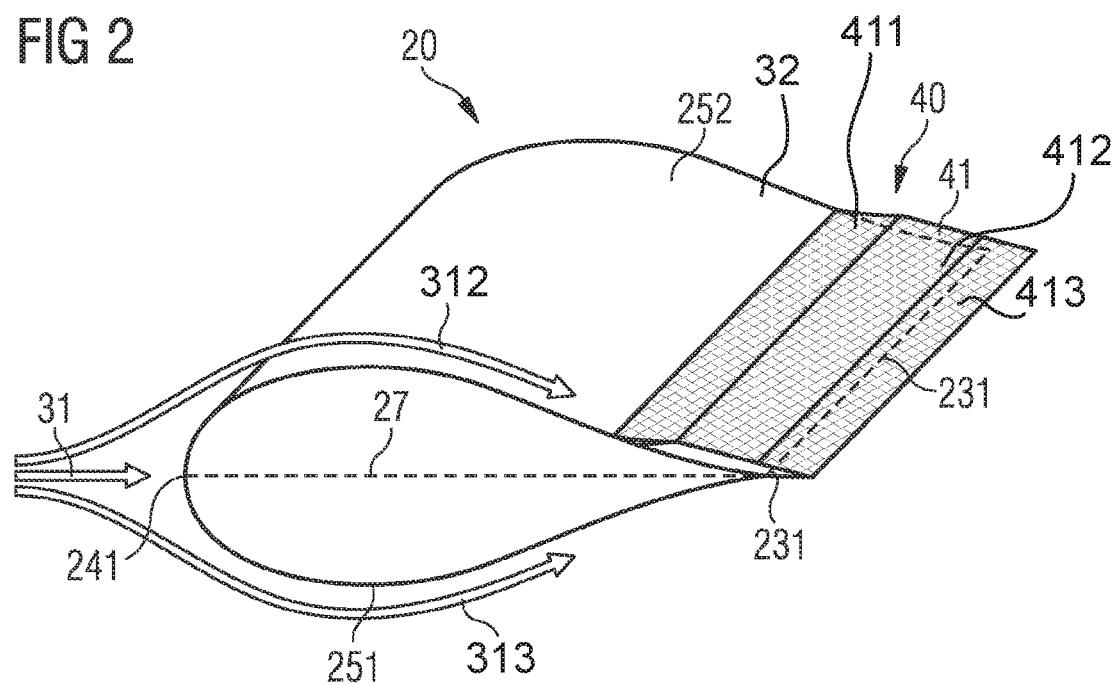
FIG. 2 shows a rotor blade with a first embodiment of a noise reduction means or device in a perspective view.

FIG. 2 shows a perspective view of a rotor blade 20 with a first embodiment of a noise reduction means or device 40. The rotor blade 20 comprises a suction side 252 and a pressure side 251. Furthermore, it comprises a leading edge 241 and a trailing edge 231. Airflow 31 flows along the surfaces 32 of the rotor blade 20. In the example shown in FIG. 2, the airflow impinges at the leading edge section 24 of the rotor blade 20 in a direction that is parallel to the chord line 27 of the rotor blade 20.

The airflow 31 is separated into an upper airflow 312 and a lower airflow 313. The upper airflow 312 flows along the suction side 252 of the rotor blade and the lower airflow 313 flows along the pressure side 251 of the rotor blade. Downstream of the trailing edge 231, the upper airflow 312 and the lower airflow 313 reunite together.

The noise reduction means or device 40 comprises a cover 41 and connection means or device by which the cover 41 is connected to the surface 32 of the rotor blade 20. The cover 41 is arranged in a predetermined distance to the surface 32 of the rotor blade 20. Note that in the example shown in FIG. 2, the cover 41 can be subdivided into three parts: an upstream part 411, a middle part 412 and a downstream part 413.

The upstream part 411 is located most upstream with regard to the airflow 31 and ensures a smooth transition of the surface 32 of the rotor blade 20 and the noise reduction means or device 40. The middle part 412 comprises a substantially constant distance to the surface 32 of the rotor blade. The downstream part 413 ensures a smooth transition to the chordal plane of the rotor blade. The chordal plane is defined as the plane that is spanned from the chord line 27 and the span 26 of the rotor blade.

Figure 3:
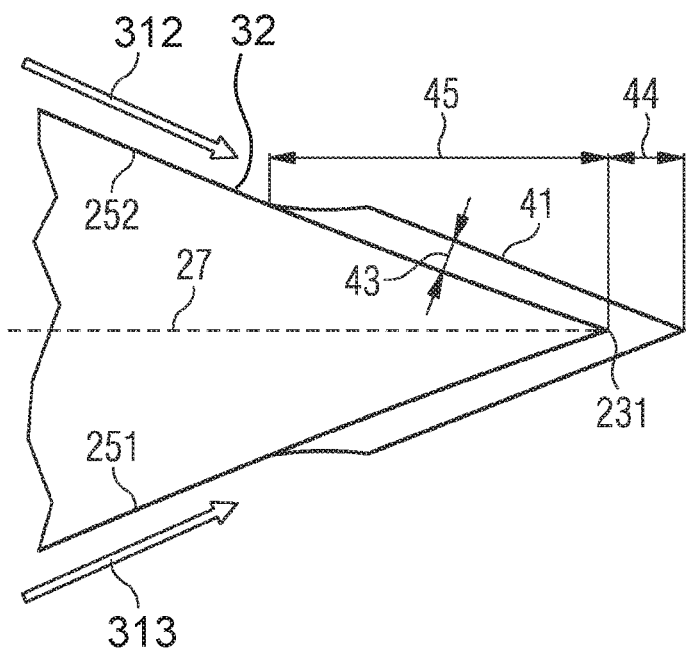
FIG. 3 shows a second embodiment of a noise reduction means or device in a detailed and cross-sectional view.

FIG. 3 shows a second embodiment of a noise reduction means or device 40 in a cross-sectional view. Again, the suction side 252 and the pressure side 251 are depicted. The cover 41 is arranged in a predetermined distance 43 with regard to the surface 32 of the rotor blade. An extension of the middle part 412 of the cover 41 downstream of the trailing edge 44, i.e. a downstream part 413, and an extension of the cover 41 upstream of the trailing edge 45, i.e. an upstream part 411, can be seen. Note the smooth transition that the cover 41 is following between the surface 32 of the rotor blade 20 upstream of the trailing edge 231 and the equal and constant part of the cover 41 with regard to the surface of the rotor blade.

Figure 4:
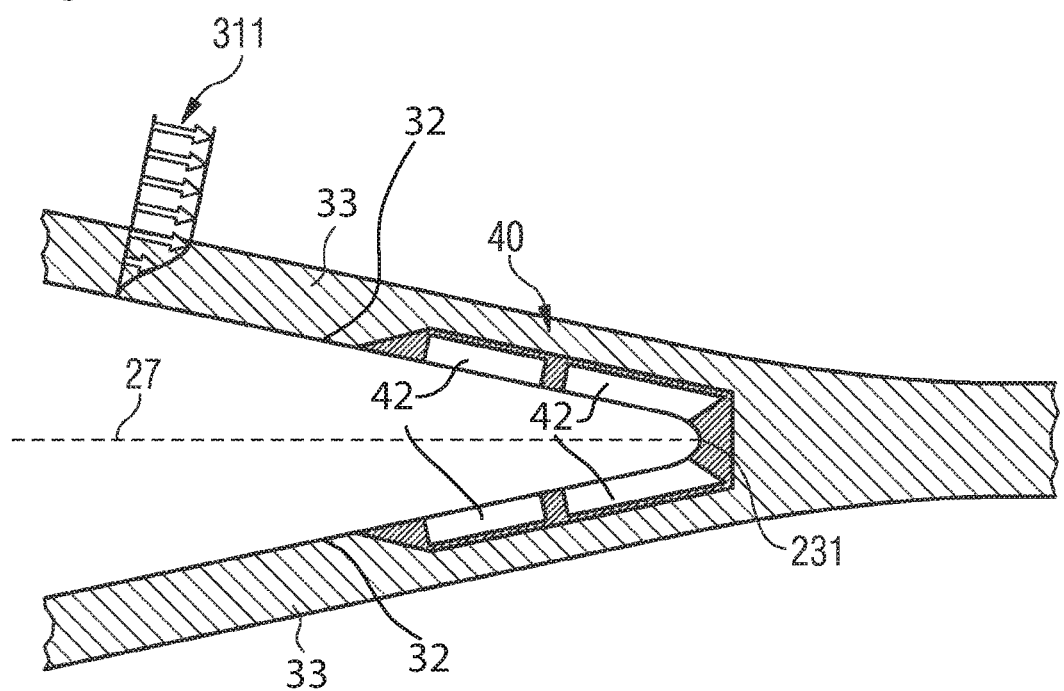
FIG. 4 illustrates the boundary layer of a rotor blade.

FIG. 4 shows an embodiment of a noise reduction means or device 40 similar to the second embodiment. Here, the connection means or device 42 are explicitly illustrated. FIG. 4 also illustrates the boundary layer 33 and a velocity profile 311 of the airflow 31. The lengths of the arrows of the velocity profile 311 symbolize the value of the velocity of the airflow. It can be seen that the value of the velocity is small in immediate proximity with regard to the surface 32 and increases with increasing distance away from the surface 32. When the velocity of the airflow reaches a value of 99 percent of the free stream velocity of the airflow, the boundary layer finishes. It can be seen that the noise reduction means or device 40 is located entirely within the boundary layer 32.

Figure 5:
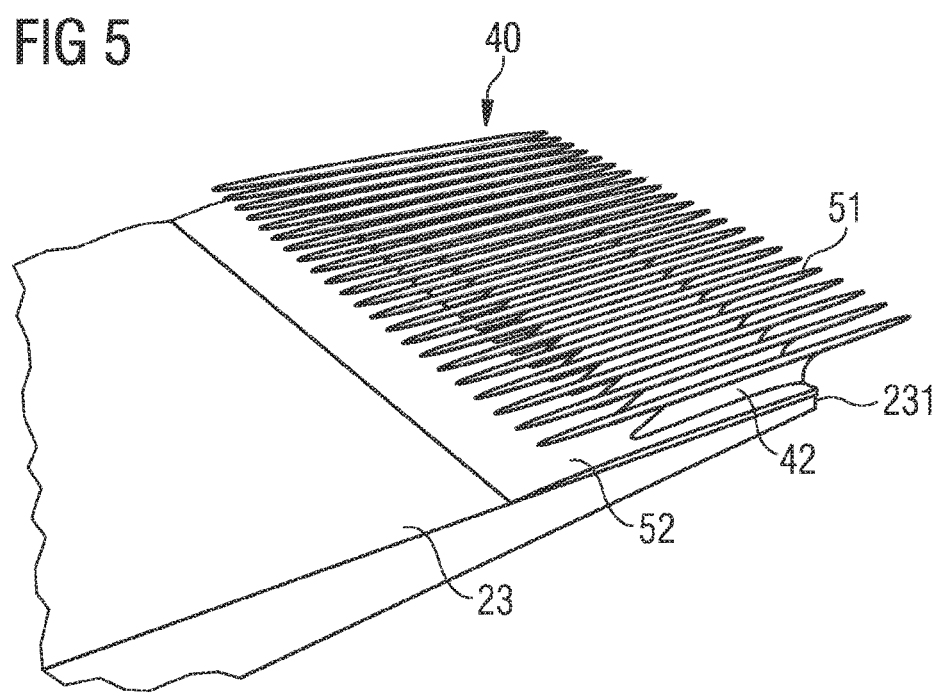
FIG. 5 shows a third embodiment of a noise reduction means or device.
Figure 6:
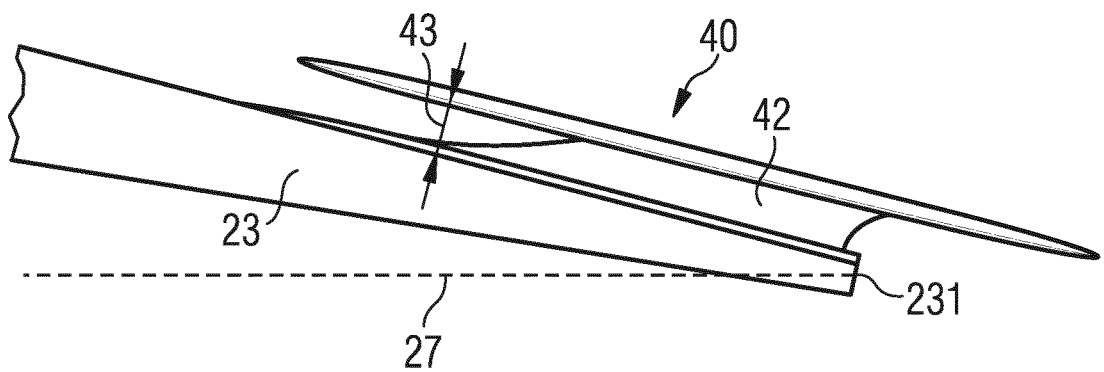
FIG. 6 shows a cross-sectional view of the third embodiment of the noise reduction means or device.

FIG. 5 shows a third embodiment of a noise reduction means or device 40 in a perspective view, while FIG. 6 shows this third embodiment of the noise reduction means or device 40 in a cross-sectional view.

The third embodiment is also referred as the "comb embodiment" or "needles embodiment". This is due to the fact that the cover 41 is realized by a set of bars 51 which are arranged substantially parallel to each other. The bars 51 are connected via connection means or device 42 to the surface 32 of the rotor blade. In particular, the connection means or device 42 directly connect with a connection plate 52. The connection plate 52 is then connected with the surface 32 of the rotor blade.

This is advantageous as the connection means or device 42 can separately be attached to the connection plate 52 and the connection plate 52 as a whole can be attached to the surface 32 of the rotor blade. The bars 51 comprise a predetermined distance 43 of a few millimeters to a few centimeters between the cover and the surface 32 of the rotor blade. Also note that the bars 51 partially extend downstream of the trailing edge 231.

Figure 7:
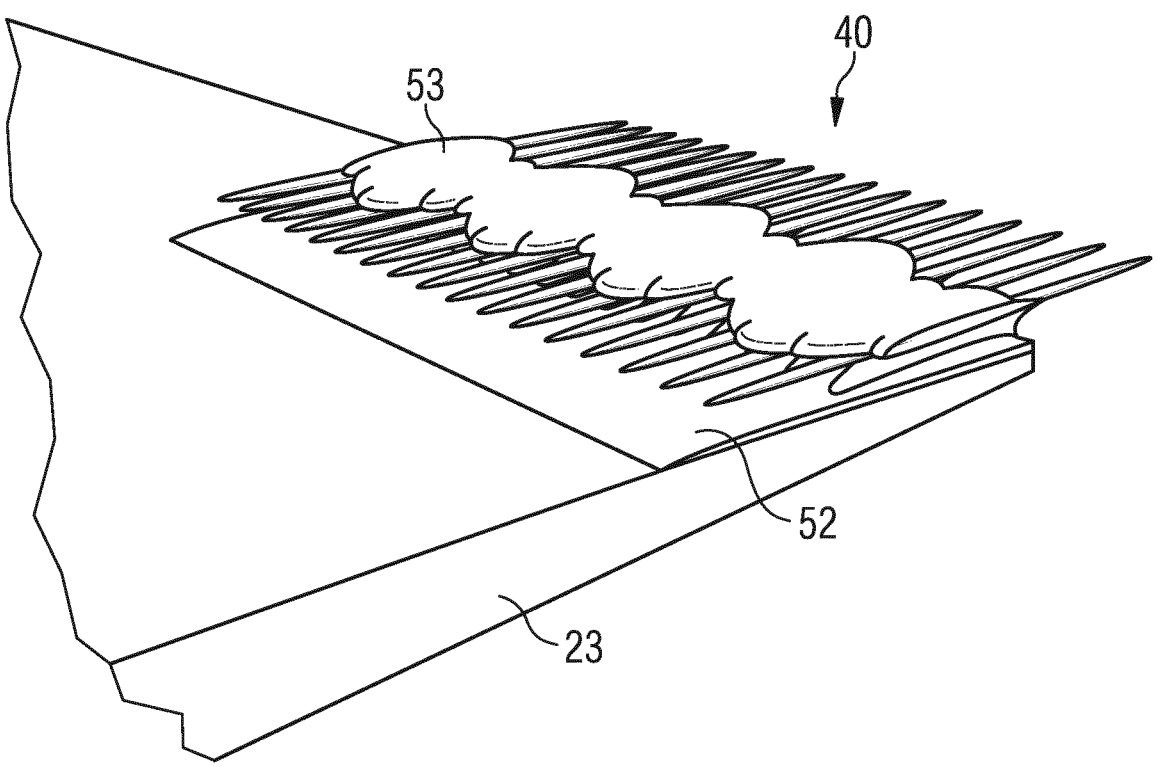
FIG. 7 shows a fourth embodiment of a noise reduction means or device.

FIG. 7 shows a fourth embodiment of a noise reduction means or device 40. In this case, the set of bars 51 is combined with a noise reduction shield 53. The noise reduction shield 53 covers a part of the cover. It does not cover the whole cover, thus an appropriate porosity of the cover is still given. Note that the noise reduction shield 53 may have serrated leading and trailing edges as shown in FIG. 7.

Figure 8:
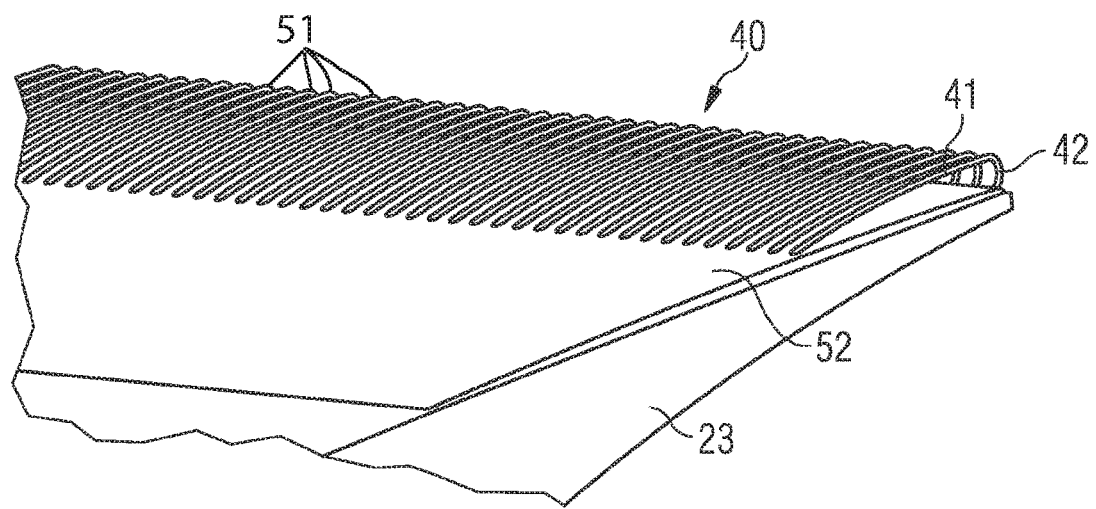
FIGS. 8 and 9 show a fifth embodiment of a noise reduction means or device.
Figure 9:
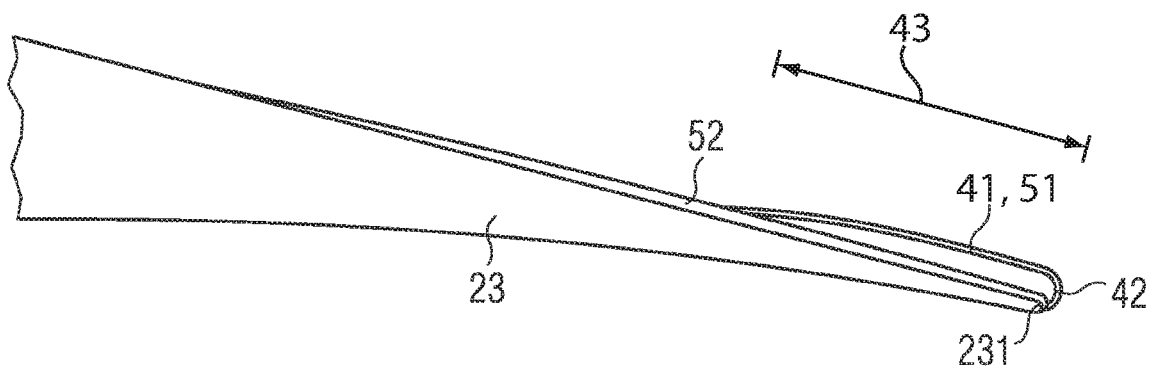

FIGS. 8 and 9 show a fifth embodiment of a noise reduction means or device 40. FIG. 8 shows the fifth embodiment in a perspective view, FIG. 9 shows the same embodiment in a cross-sectional view.

The noise reduction means or device 40 is designed such that the cover 41 and the connection means or device 42 are built in one single piece. The cover 41 comprises a set of bars 51, which may also be referred to as needles. The bars 51 are attached to the rotor blade via a connection plate 52. Note that the bars 51 extend slightly downstream of the trailing edge 231 in a curved manner.

A concrete example of the fifth embodiment includes a predetermined distance 43 of the cover 41 from the surface 32 of the rotor blade at the trailing edge 231 of the rotor blade of five millimeters. The porosity of the cover 41 is 70 percent. The bars 51 have a diameter of approximately one millimeter.

Figure 10:
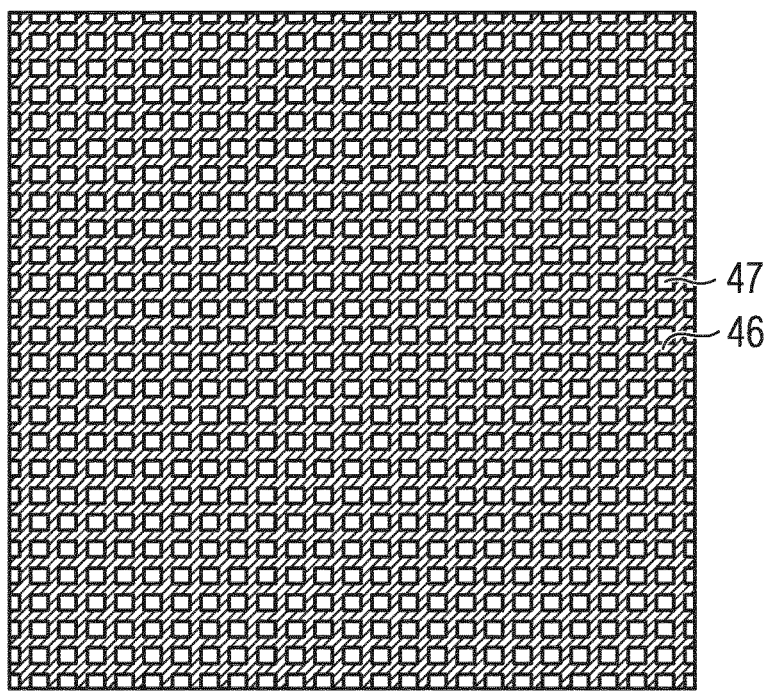
FIGS. 10 and 11 show embodiments of a mesh-shaped cover of a noise reduction means or device.
Figure 11:
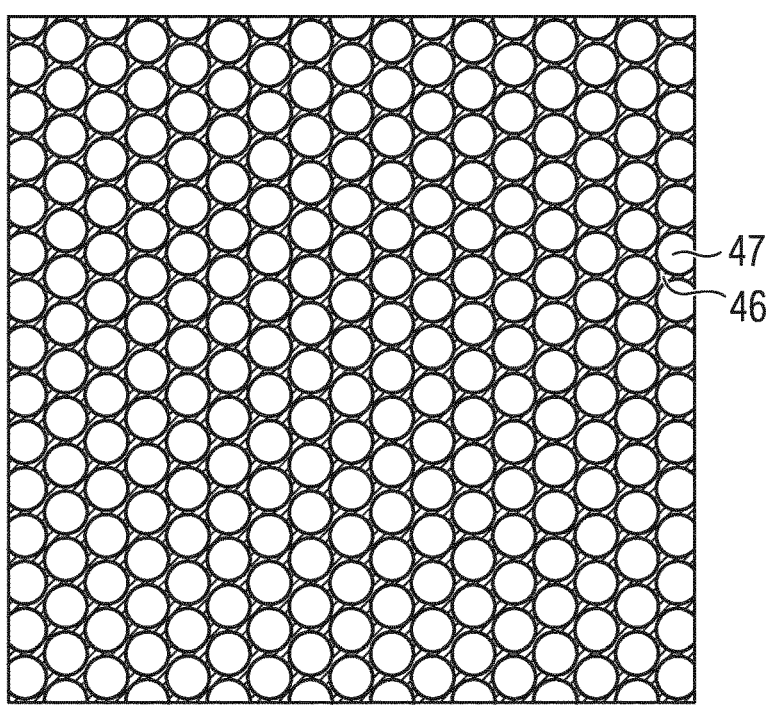

FIGS. 10 and 11 show two embodiments of a mesh-shaped cover.

FIG. 10 comprises threads 46. The threads 46 can be subdivided into a first set of first threads and a second set of second threads. The first threads are parallel to each other, and the second threads are parallel to each other. Additionally, the first threads are substantially perpendicular to the second threads. Between the threads 46, open space 47 is arranged. By setting the thickness of the threads 46 and the dimensions of the open space 47, the porosity can be chosen. As an example, a thickness of the threads 46 between 0.2 millimeters and 0.5 millimeters, and a diameter of the openings between 0.5 millimeters and 3 millimeters could be advantageous.

In FIG. 11, a different set of threads 46 with open space 47 in-between is shown.

Both mesh-shaped covers have the advantage that they are inexpensive, readily available and well proven.

Figure 12:
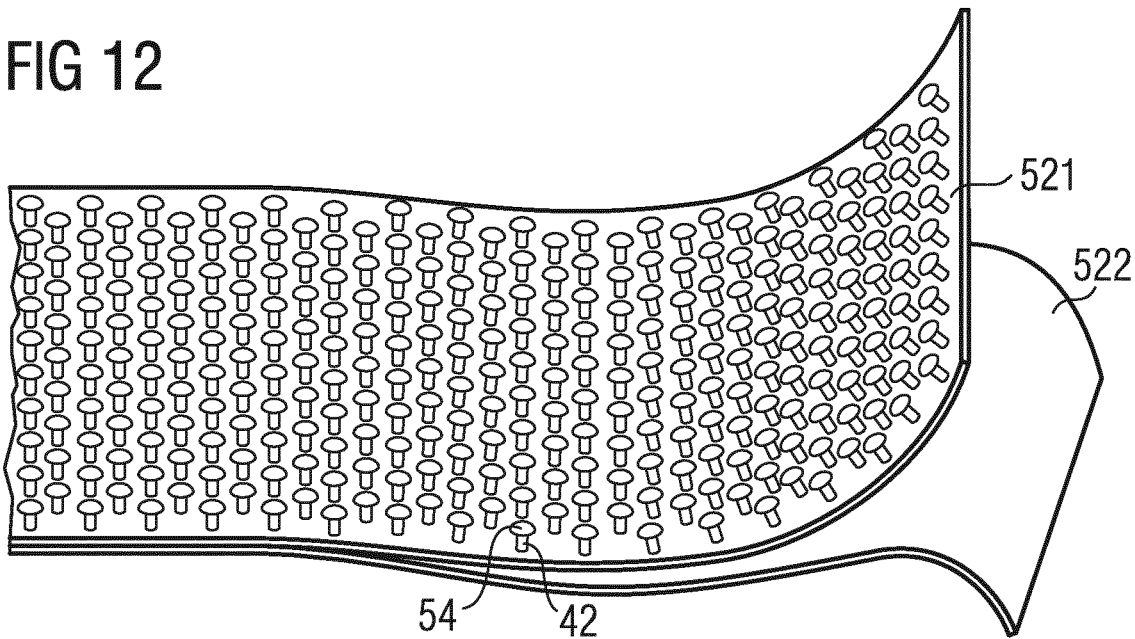
FIG. 12 shows another embodiment of a cover of a noise reduction means or device.

FIG. 12 shows another embodiment of a noise reduction means or device. It comprises a plurality of regularly distributed sub-covers 54, each of them connected to a first connection plate 521 by connection means or device 42. The sub-covers 54 have the shape of a mushroom head. Lateral extensions of the sub-covers 54 and the spacing between the sub-covers can be chosen according to the desired porosity of the cover. The first connection plate 521 and the second connection plate 522 are attachable with each other by means or device of an adhesive. Additionally, the first and the second connection plate 521, 522 may be configured flexible.

Exemplarily, a 3M™ Dual Lock™ Reclosable Fastener, which is a general purpose acrylic adhesive on the back of a polypropylene reclosable fastener, could be used.

Figure 13:
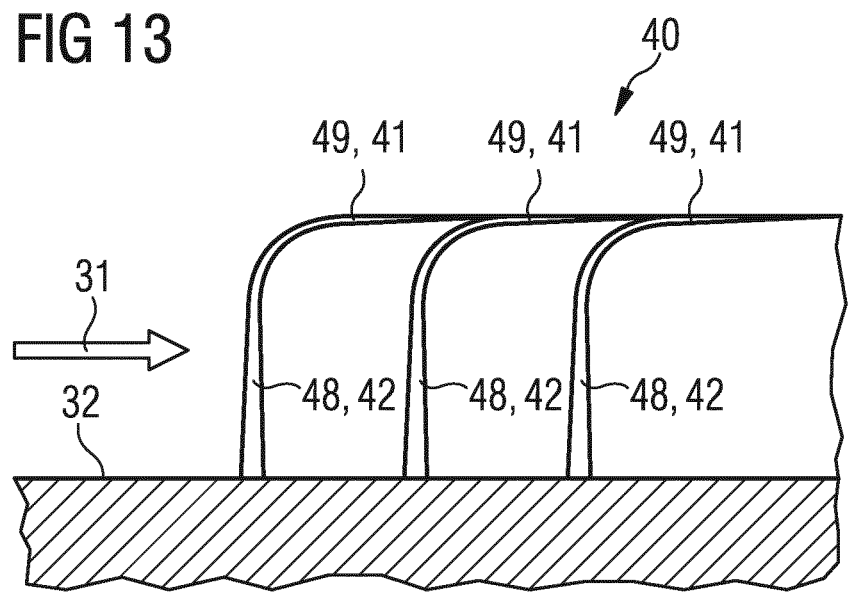
FIG. 13 shows a sixth embodiment of a noise reduction means or device.

Finally, FIG. 13 shows a sixth embodiment of a noise reduction means or device 40. It comprises a stiff first portion 48 acting as connection means or device 42 and a flexible second portion 49 acting as the cover 41. The second portion 49 may comprise side branches or barbs in order to realize a cover 41 with a desired porosity.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:
1. A rotor blade for a wind turbine, wherein
the rotor blade comprises a pressure side, a suction side, a leading edge section with a leading edge, and a trailing edge section with a trailing edge,
an airflow flows along a surface of the rotor blade from the leading edge section to the trailing edge section and builds up a boundary layer in close proximity to the surface of the rotor blade,
the rotor blade comprises a noise reduction device for reducing noise which is generated by interaction of the airflow and the rotor blade, the noise reduction device is located within the boundary layer of the rotor blade, the noise reduction device comprises a cover, the cover spans at least over a part of the surface of the rotor blade, the cover is located at a predetermined distance from the surface of the rotor blade, and the cover is porous with an open area fraction between 30 percent and 95 percent, the cover is attached on a connection plate and the connection plate is connected to the surface of the rotor blade, and wherein the cover comprises a set of bars wherein each bar of the set of bars extends downstream from the connection plate at the trailing edge in a curved manner and reconnect to the connection plate at a location upstream from the trailing edge, wherein between the connection plate and each bar of the set of bars is open space.

2. The rotor blade according to claim 1, wherein the predetermined distance between the surface of the rotor blade and the cover of the noise reduction device is between 0.5 millimeters and 100 millimeters.

3. The rotor blade according to claim 1, wherein the rotor blade comprises a root section, where the rotor blade is capable of being attached to a rotor, and a tip section, which is a section of the rotor blade that is furthest away from the root section, and the noise reduction device is connected to the rotor blade in an outboard section of the rotor blade, wherein the outboard section of the rotor blade is defined as being a 40 percent section of the rotor blade which is adjacent to the tip section.

4. The rotor blade according to claim 1, wherein the bars are orientated in a streamwise direction with regard to the airflow.

5. The rotor blade according to claim 1, wherein the noise reduction device covers at least partially the trailing edge section of the rotor blade.

6. The rotor blade according to claim 1, wherein the cover extends further downstream into the airflow than the trailing edge of the rotor blade.

* * * * *